United States Patent [19]

Shiraishi

[11] Patent Number: 5,452,129
[45] Date of Patent: Sep. 19, 1995

[54] OPTICAL LOW-PASS FILTER

[75] Inventor: Akihiko Shiraishi, Kawasaki, Japan

[73] Assignee: Canon Kabushiki Kaisha, Tokyo, Japan

[21] Appl. No.: 97,719

[22] Filed: Jul. 27, 1993

Related U.S. Application Data

[63] Continuation-in-part of Ser. No. 675,966, Mar. 27, 1991, abandoned.

[30] Foreign Application Priority Data

Mar. 30, 1990 [JP] Japan .................. 2-86170

[51] Int. Cl.⁶ .................. G02B 5/30; H04N 9/04
[52] U.S. Cl. .................. 359/497; 359/498; 348/290; 348/335
[58] Field of Search .................. 350/380, 382, 400, 401, 350/404, 405; 358/44, 55; 359/494, 495, 497, 498, 499; 348/272, 273, 289, 290, 335, 336

[56] References Cited

U.S. PATENT DOCUMENTS

| | | | |
|---|---|---|---|
| 3,588,224 | 6/1971 | Pritchard | 358/55 |
| 4,227,208 | 10/1980 | Takanashi et al. | 358/55 |
| 4,539,584 | 9/1985 | Otake | 350/404 |
| 4,605,956 | 8/1986 | Cok | 358/55 |
| 4,626,897 | 12/1986 | Sato et al. | 350/401 |
| 4,761,682 | 8/1988 | Asaida | 350/404 |
| 4,807,981 | 2/1989 | Takizawa et al. | 350/404 |
| 5,029,010 | 7/1991 | Shiraishi | 358/225 |

FOREIGN PATENT DOCUMENTS

| | | |
|---|---|---|
| 0204469 | 12/1986 | European Pat. Off. . |
| 0384701 | 8/1990 | European Pat. Off. . |
| 60-164719 | 8/1985 | Japan .................. 350/404 |
| 63-269118 | 11/1988 | Japan . |

Primary Examiner—Ricky D. Shafer
Attorney, Agent, or Firm—Fitzpatrick, Cella, Harper & Scinto

[57] ABSTRACT

A video camera equipped with an optical low-pass filter, which is to be arranged in front of a solid state imaging device. The optical low-pass filter comprises: a first sub-refractive plate adapted to separate an incident ray of light by a separation distance of $d_1$ in a direction deviated 45° clockwise or counterclockwise with respect to the horizontal scanning direction of the solid state imaging device; a second sub-refractive plate adapted to separate an incident ray of light by a separation distance of $d_2$ in a direction parallel to the horizontal scanning direction of the solid state imaging device; and a third sub-refractive plate adapted to separate an incident ray of light by a separation distance of $d_1$ in a direction perpendicular to the direction of separation of the first sub-refractive plate; wherein the second sub-refractive plate is arranged between the first and third sub-refractive plates; and wherein the condition: $d_1 > \sqrt{2} d_2$ is satisfied.

2 Claims, 8 Drawing Sheets

⊙ --- BASE-BAND COMPONENT

● --- CARRIER COMPONENT OF ILLUMINATION SIGNAL

△ --- CARRIER COMPONENT OF COLOUR DIFFERENCE SIGNAL

COLOUR DIFFERENCE SIGNAL BAND

① → SEPARATION BY 1ST. SUB-REFRACTIVE PLATE

② → SEPARATION BY 2ND. SUB-REFRACTIVE PLATE

③ → SEPARATION BY 3RD. SUB-REFRACTIVE PLATE

①　SEPARATION BY 1ST. SUB-REFRACTIVE PLATE

②　SEPARATION BY 2ND. SUB-REFRACTIVE PLATE

③　SEPARATION BY 3RD. SUB-REFRACTIVE PLATE

OPTICAL LOW-PASS FILTER

This application is a continuation of application Ser. No. 07/675,996 filed Mar. 27, 1991, now abandoned.

BACKGROUND OF THE INVENTION

1. Field of the Invention

This invention relates to an optical low-pass filter which is arranged in the incidence optical path of a solid state imaging device, such as a CCD, for performing two-dimensional sampling and which serves to suppress the influence of carrier components.

2. Related Background Art

FIGS. 4A and 4B show pixel arrangements in a solid state imaging device generally in use. The reference symbol $p_H$ indicates the sampling pitch in the horizontal direction, and the reference symbol $p_V$ indicates the sampling pitch in the vertical direction. In the pixel arrangement shown in FIG. 4A, complementary color filters of Ye, Mg, Cy and Gr are arranged in a mosaic-like fashion, with a cycle of two pixels in the horizontal direction and a cycle of four pixels in the vertical direction. In the pixel arrangement shown in FIG. 4B, pure-color filters of R, G and B are used, with the G pixels being arranged in a stripe-like fashion in the vertical direction and the R and B filters being arranged alternately in the vertical direction with a cycle of two pixels.

These lattice-like arrangement patterns are used in subject-light sampling. As is apparent from the theorem of sampling, a frequency component which is above half the sampling frequency cannot be reproduced theoretically. If an image having a frequency component above this level is formed on a solid state imaging device, that frequency component will appear in the form of what is generally called "aliasis".

As is well known in the art, the solid state imaging device shown in FIGS. 4A and 4B generally involves the generation of harmful carrier components of illumination and color difference signals at the positions indicated in the spatial frequency plane shown in FIG. 5. That is, the illumination signal carrier component centered at the point ($f_H=1/p_H$, $f_V=0$) causes moiré and beat in the image of a subject exhibiting a fine vertical-stripe-like pattern of black and white, and the color difference signal carrier component centered at the point ($f_H=1/2p_H$, $f_V=0$) causes a so-called spurious color signal which generates colors such as green and magenta in the image of a subject exhibiting a relatively rough vertical-stripe-like pattern. The illumination signal carrier component centered at the point ($f_H=0$, $f_V=1/p_V$) causes moiré and beat in the image of a subject exhibiting a fine horizontal-stripe-like pattern of black and white.

According to the theorem of sampling, it is necessary to remove from the incident ray of light the horizontal frequency component at which $f_H$ is $1/2p_H$ or more and the vertical frequency component at which $f_V$ is $1/2p_V$ or more before these harmful carrier components can be eliminated. Further, since the color signal carrier component exists in the horizontal direction at the point where $f_H=1/2p_H$, the horizontal frequency component corresponding to the frequency band of the color signal centered at this point must be removed. FIGS. 6A and 6B show ideal optical frequency characteristics thus obtained. Of these drawings, FIG. 6A shows the horizontal frequency characteristic and FIG. 6B shows the vertical frequency characteristic.

An optical low-pass filter intended to attain such a characteristic is proposed in, for example, Japanese Patent Laid-Open Application No. 60-164719. In an embodiment disclosed therein, an optical low-pass filter is formed by a first, a second, and a third sub-refractive plate adapted to separate an incident light into two rays in the directions of 45°, 0° and −45°, respectively. Assuming that the respective separation distances of these sub-refractive plates are $d_1$, $d_2$ and $d_3$, the relationships: $d_2=p_H$, and $d_1=d_3=d_2 \sqrt{2}$ are satisfied. This optical low-pass filter separates a single incident ray of light in the manner shown in FIG. 7 and the frequency characteristic thereby obtained are shown in FIGS. 8A and 8B, of which FIG. 8A shows the MTF characteristic in the horizontal direction and FIG. 8B shows the MTF characteristic in the vertical direction. As shown in the drawings, the characteristic in the horizontal direction is almost equivalent to the ideal characteristic shown in FIG. 6A, with the undesirable frequency components removed. The characteristic in the vertical direction, on the other hand, has the problem described below:

In Japanese Patent Laid-Open Application No. 64-164719, mentioned above, the separation distance in the vertical direction of the incident light separated in the manner shown in FIG. 7 is determined by the pixel sampling pitch $p_H$ in the horizontal direction and does not depend on the sampling pitch $p_V$ in the vertical direction. As a result, the ideal cut-off frequency of the MTF characteristic in the vertical direction is represented by the point of frequency of $1/p_H$, which depends on the pitch $p_H$ in the horizontal direction, while it should be a frequency represented by a point of frequency of $1/2p_V$, which is related to the pitch $p_V$ in the vertical direction.

Thus, although the above-described optical low-pass filter can provide a satisfactory MTF characteristic in the vertical direction when used in a solid state imaging device in which the value of $1/p_H$ is close to that of $1/2p_V$, it cannot provide a satisfactory level of MTF characteristic in the vertical direction when used in a solid state imaging device in which $p_H$ is smaller than $2p_V$, i.e., in which the pitch in the horizontal direction is so small that the difference between the value of $1/p_H$ and that of $1/2p_V$ is rather large.

Such a condition is likely to be produced in a solid state imaging device which is equipped with a large number of pixels in the horizontal direction with a view to obtaining a high level of horizontal resolution. In such an imaging device, the number of pixels $N_V$ in the vertical direction is fixed to a value which is determined in accordance with the television system used (approx. 500 in the case of the NTSC system, and approx. 600 in the case of the PAL system), so that, the value of $p_V$ remains constant, whereas $p_H$ varies in accordance with the number of pixels $N_H$ in the horizontal direction; the ratio of $p_H$ to $p_V$ decreases as $N_H$ is increased. In particular, it should be noted in this connection that the number of pixels $N_H$ in the horizontal direction of a solid state imaging device constitutes a very important parameter in terms of the specification of the camera to which it is applied since the number is proportional to the horizontal resolution of the camera.

The horizontal resolution of a video camera having a solid state imaging device whose number of pixels in the horizontal direction is $N_H$ is generally said to be approx. $0.6 N_H$ TV. For example, in a video camera whose horizontal resolution is 250 TV, the number of pixels $N_{H1}$ in the horizontal direction is approx. 410. Assuming that the sampling pitch in the horizontal direction in this case is $p_{H1}$, $p_V/p_{H1}$ is approximately 0.60.

In the case of a video camera whose horizontal resolution is 400 TV, the number of pixels $N_{H2}$ in the horizontal direction is approximately 670. Assuming that the sampling pitch in the horizontal direction in this case is $p_{H2}$, $p_V/p_{H2}$ is approximately 1.00.

Further, in the case of a video camera whose horizontal resolution is 480 TV, the number of pixels $N_{H3}$ in the horizontal direction is approximately 800. Assuming that the sampling pitch in the horizontal direction in this case is $P_{H3}$, $p_V/p_{H3}$ is approximately 1.17.

If the MTF characteristic in the horizontal direction represented by the curve 801 of FIG. 8A is achieved by applying the above-described optical low-pass filter to these video cameras, the MTF characteristic in the vertical direction is to be represented by the solid line 802 in the case of the camera whose horizontal resolution is 250. In the case of the camera whose horizontal resolution is 400, the MTF characteristic in the vertical direction is to be represented by the dotted line 803. In the case of the camera with a 480 TV horizontal resolution, it is to be represented by the dashed line 804. The MTF characteristic represented by the solid line 802 is close to the ideal characteristic shown in FIG. 6B, i.e., of a satisfactory level, whereas, the characteristics represented by the dotted line 803 and the dashed line 804 are strikingly different from the ideal characteristic, which means the frequency component cut-off is not effected to a satisfactory degree in these cases. Thus, although the above-described low-pass filter is suitable for a video camera with a relatively low horizontal resolution of 250 TV or so, it cannot be applied to a video camera whose horizontal resolution is higher than that.

Japanese Patent Laid-Open Application No. 63-269118 discloses an optical low-pass filter which is formed by a first, a second, and a third sub-refractive plate adapted to separate an incident ray of light into two rays in the directions of: 45°, 0° and −45°, respectively, with respect to the horizontal scanning direction of the associated solid state imaging device. Assuming that the respective separation distances of these sub-refractive plates are $d_1$, $d_2$ and $d_3$, the relationships: $d_3=d_1$, $d_2=p_H$, and $p_H/\sqrt{2}<d_1< \sqrt{2}p_H$ are satisfied. This optical low-pass filter separates a single incident ray of light in the manner shown in FIG. 9 and the frequency characteristics thereby obtained are shown in FIGS. 10A and 10B, of which FIG. 10A shows the MTF characteristic in the horizontal direction and FIG. 10B shows the MTF characteristic in the vertical direction.

As shown in FIG. 10A, the above-mentioned prior-art optical low-pass filter has, in the horizontal direction, a first trap point D where $f_H=1/2p_H$ and a second trap point E at a frequency at which $f_H=f_0$ ($1/2p_H<f_0<1/p_H$) In the vertical direction, it has a trap point F at a frequency of $f_0$ at which $f_V=f_0$. Such a low-pass filter can provide a satisfactory level of low-pass effect when used in a solid state imaging device whose horizontal resolution is approx. 400 TV, i.e., in which the number of pixels $N_{H2}$ in the horizontal direction is approx. 670, in other words, in a solid state imaging device in which the ratio of the sampling pitch $p_V$ in the vertical direction to the sampling pitch $p_H$ in the vertical direction is approx. 1.00. Further, $1/2p_H$ is approximately equal to $1/2p_V$, i.e., $1/p_H$ is approximately equal to $1/p_V$, so that, if the frequency $f_0$ of the above-mentioned second trap point E is between these values, i.e., if $f_0=3/4p_H \approx 3/4p_V$, the cut-off characteristic obtained can be substantially minimized, in terms of both the horizontal and vertical directions, around points between the respective Nyquist frequencies and illumination signal carrier frequencies, i.e., in the ranges where $1/2p_H<f_H<1/p_H$ and $1/2p_V<f_V<1/p_V$. In this condition, the following relationship holds true:

$$d_1 = \frac{2\sqrt{2}}{3}p_H \approx \frac{2\sqrt{2}}{3}p_V$$

The horizontal and vertical MTF characteristics are represented by the solid-line curve 1001 of FIG. 10A and the solid-line curve 1002 of FIG. 10B, respectively. Both of these solid-line curves are nearly equivalent respectively to the ideal characteristics shown in FIGS. 6A and 6B, i.e., they are of a satisfactory level.

However, even this optical low-pass filter involves the following problem when used in a video camera whose resolution is beyond 400 TV:

In a solid state imaging device having such a resolution, the pitch in the horizontal direction is generally smaller than the pitch in the vertical direction, That is, the relationship: $p_H<p_V$ is satisfied. For example, in a video camera whose horizontal resolution is 480 TV, the relationship: $p_H \approx p_V/1.17$ holds true, where $p_H$ is the sampling pitch in the horizontal direction. Here, considered will be a case where the low-pass filter disclosed in Japanese Patent Laid-Open Application No. 63-269118 is used in this solid state imaging device. If, in this case, the MTF characteristic in the horizontal direction is to be made close to the ideal characteristic represented by the curve 1001 of FIG. 10A, the resulting condition will be such that $f_H=1/2p_H$ at the first trap point D and $f_H=f_1=3/4p_H$ at the second trap point E (in the curve 1001). The MTF characteristic in the vertical direction, on the other hand, is represented by the dotted-line curve 1003 of FIG. 10B since $f_V=f_1 \approx 0.88 \cdot 1/p_V$ at the trap point F. This characteristic cannot said to be sufficiently close to the ideal characteristic shown in FIG. 6B, which means a satisfactory level of cut-off characteristic cannot be obtained with respect to the vertical direction. As a result, the aliasing distortion in the vertical direction increases.

Assuming that, in order to suppress the aliasing distortion in the vertical direction, the curve 1003 is to be made close to the curve 1002, i.e., the frequency $f_1$ at the trap point F' is to be made close to $f_0$, the frequency $f_1$ at the second trap point E in the MTF characteristic in the horizontal direction shown in FIG. 10A decreases. In this case, the MTF characteristic at the frequency $1/p_H$ of the illumination signal carrier component in the horizontal direction becomes excessively high, with the result that a satisfactory level of cut-off characteristic cannot be obtained.

The above problem becomes more conspicuous as the number of pixels $N_H$ in the horizontal direction of the solid state imaging device increases. Recently, the number of pixels in a solid state imaging device has been increasing, and various types of devices having approximately 800 pixels or more in the horizontal direction have been developed. Such solid state imaging devices do not allow the application of the above-described optical low-pass filter.

SUMMARY OF THE INVENTION

It is the object of this invention to provide an optical low-pass filter which is suitable for a solid state imaging device in which the sampling pitch in the horizontal direction is smaller than that in the vertical direction, as well as a video camera equipped with such an optical low-pass filter.

In accordance with a preferred embodiment of this invention, an optical low-pass filter comprises: a first sub-refractive plate adapted to separate an incident ray of light into two rays by a separation distance of $d_1$ and in a direction 45° deviated clockwise or counterclockwise with respect to the horizontal scanning direction of a solid state imaging device; a second sub-refractive plate adapted to separate an incident ray of light by a separation distance of $d_2$ parallel to the above-mentioned horizontal scanning direction; and a third sub-refractive plate adapted to separate an incident ray of light by a separation distance of $d_3$ perpendicularly with respect to the direction of separation of the first sub-refractive plate; wherein the second sub-refractive plate is arranged between the first and third sub-refractive plates; and wherein the separation distances $d_1$ and $d_2$ satisfy the relationship: $d_1 \geq \sqrt{2} d_2$. In accordance with this invention, there is further provided a video camera equipped with such an optical low-pass filter.

Even when used in a solid state imaging device which has a relatively large number of pixels in the horizontal direction, i.e., in which the sampling pitch $p_H$ in the horizontal direction is smaller than the sampling pitch $p_V$ in the vertical direction, the optical low-pass filter of the present invention helps to attain a substantially ideal frequency characteristic not only in the horizontal direction but also in the vertical direction. Accordingly, with the optical low-pass filter of this invention, a solid state imaging camera in which the generation of aliasing distortion can be avoided to a considerable degree can be realized. As used herein the term "sub-refractive plate" has the same meaning as "double refraction plate".

DESCRIPTION OF THE PREFERRED EMBODIMENTS

An embodiment of this invention will now be described with reference to the accompanying drawings.

Figure 1A:
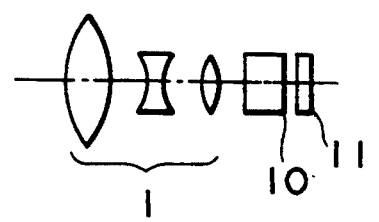
FIGS. 1A and 1B are diagrams showing the construction of an embodiment of this invention.
Figure 1B:
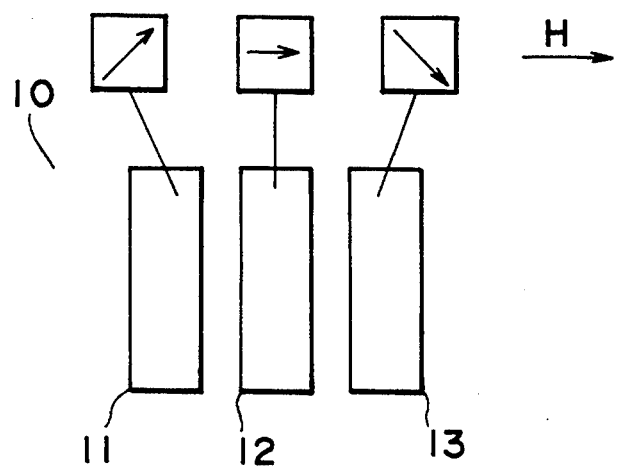

FIG. 1A is a sectional view focusing on the optical system of a video camera in accordance with this invention. The system shown includes a photographic lens 1, an optical low-pass filter 10 in accordance with this invention, and an imaging device 11 for converting the optical images formed by the photographic lens 1 to electrical energy. FIG. 1B shows the optical low-pass filter 10 of FIG. 1A. This optical low-pass filter is composed of a first sub-refractive plate 11, a second sub-refractive plate 12, and a third sub-refractive plate 13, which are arranged in order from the object side. In the drawing, the arrow H indicates the horizontal scanning direction of the imaging device, and the respective arrows of the sub-refractive plates indicate the directions in which these sub-refractive plates separate an incident ray of light into normal and abnormal rays.

Figure 2:
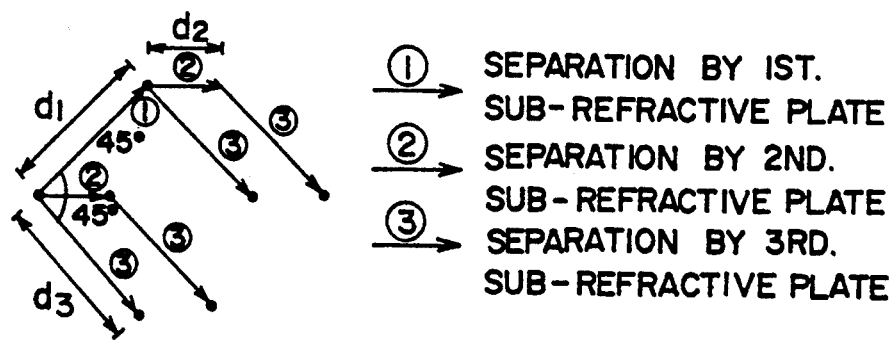
FIG. 2 is a diagram showing the way an incident ray of light is separated in accordance with this invention.

FIG. 2 shows the way a ray of light exiting from an optical low-pass filter is separated.

First, the ray of light exiting from the photographic lens 1 is separated by the first sub-refractive plate 11 into two points approximately in a direction deviated 45° with respect to the horizontal scanning direction H. Subsequently, the second sub-refractive plate 12 separates the rays of light exiting from the first sub-refractive plate 11 respectively into two points in directions parallel to the horizontal scanning direction. Further, the third sub-refractive plate 13 separates the rays of light exiting from the second sub-refractive plate 12 respectively into two points in a direction perpendicular to the direction of separation of the first sub-refractive plate 11. As a result, the incident ray of light is separated into eight rays of the same intensity, which are transmitted to the imaging device.

The respective thicknesses of the first, second and third sub-refractive plates are so determined that, assuming that the respective separation distances of the sub-refractive plates are $d_1$, $d_2$ and $d_3$, the following conditions are satisfied: $d_3 = d_1$, and $d_1 > \sqrt{2} d_2$. That is, their thicknesses are so determined that the projection component of $d_1$ to the horizontal scanning direction is longer than that of $d_2$.

The two-dimensional MTF characteristic of this optical low-pass filter can be expressed by the following equation:

$$MTF(f_H, f_V) = \cos(\pi d_2 \cdot f_H) \cdot \cos\left(\pi d_1 \frac{f_H - f_V}{\sqrt{2}}\right) \cdot \cos\left(\pi d_1 \frac{f_H + f_V}{\sqrt{2}}\right) \quad (1)$$

Assuming that the values of $d_1$ and $d_2$ are determined in such a manner that desirable frequency characteristics in the horizontal and vertical directions can be obtained for a video camera having a horizontal resolution of 480 TV, i.e., for a solid state imaging device in which the condition: $p_H = p_V/1.17$ is satisfied, the following characteristics will be obtained:

$$d_1 = \frac{2\sqrt{2}}{3} p_V, \text{ and } d_2 = p_H/2,$$

the following is obtained from the above equation (1):

$$MTF = \cos\left(\frac{\pi}{2} p_H \cdot f_H\right) \cdot \qquad (2)$$

$$\cos\left\{\frac{2}{3}\pi p_V(f_H - f_V)\right\} \cdot \cos\left\{\frac{2}{3}\pi p_V(f_H + f_V)\right\}$$

Figure 3A:
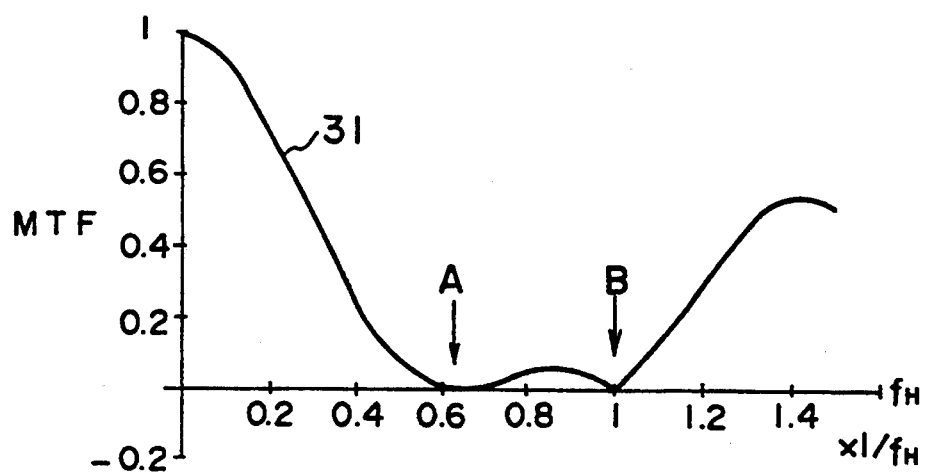
FIGS. 3A and 3B are MTF-characteristic charts of this invention.
Figure 3B:
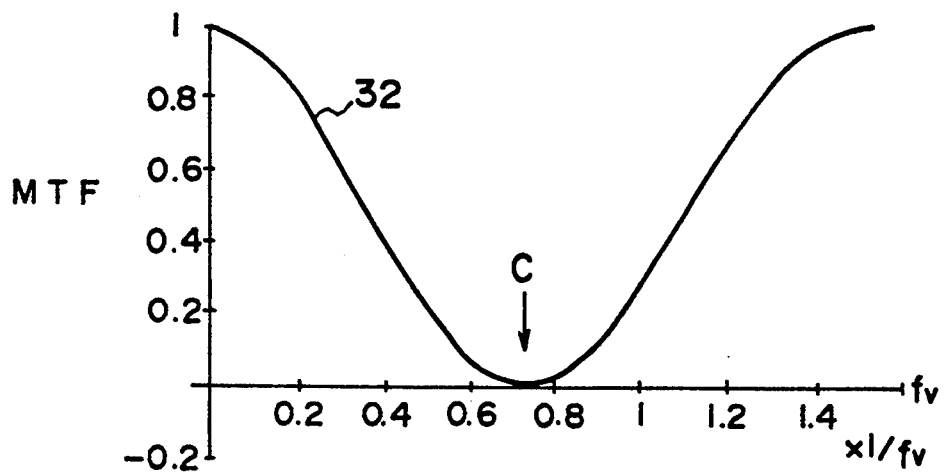
Figure 4A:
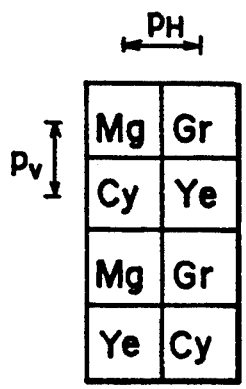
FIGS. 4A and 4B are diagrams showing pixel arrangement patterns in a solid state imaging device to which this invention is applied.
Figure 4B:
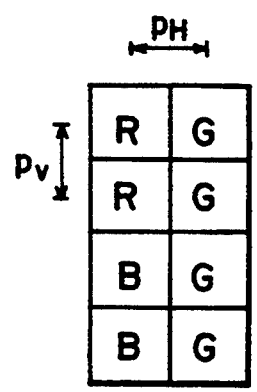
Figure 5:
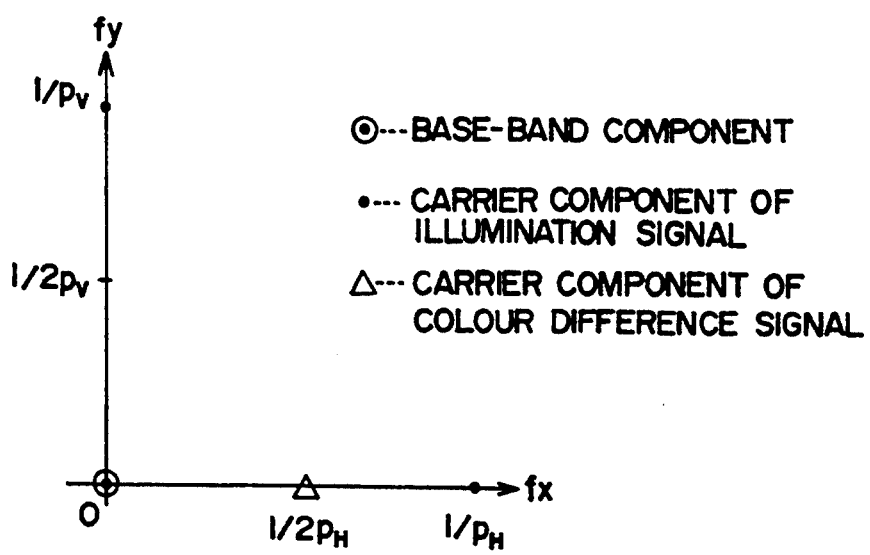
FIG. 5 is a chart showing the spatial frequency spectrum obtained by the imaging device of FIG. 4.

FIGS. 3A and 3B respectively show the MTF characteristics in the horizontal and vertical directions in this case. In the MTF characteristic in the horizontal direction, a trap point where the primary differential coefficient is zero exists at a point where $f_H = 0.64/p_H$. Further, a second trap point exists where $f_H = 1/p_H$. Accordingly, the carrier frequency of the illumination signal at the point where $f_H = 1/p_H$ is zero, and the MTF of the carrier frequency of the color difference signal at the point where $f_H = 1/2p_H$ can be expressed as follows:

$$MTF(1/2p_H, 0) =$$

$$\cos\frac{\pi}{4} \cdot \cos^2\left\{\frac{\pi}{3} \cdot \left(\frac{p_V}{p_H}\right)\right\} = 0.083 \simeq -22 \text{ dB}$$

Figure 6A:
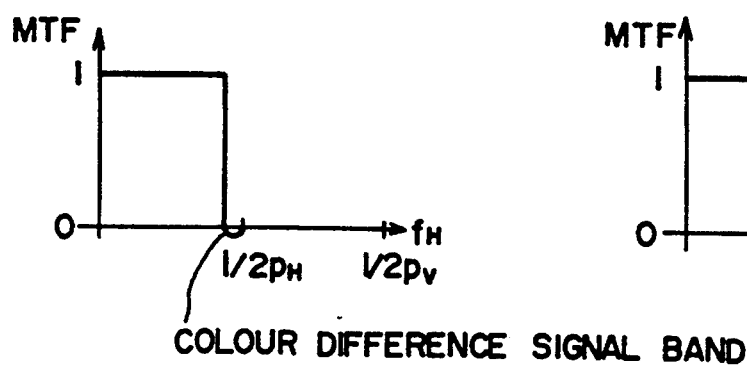
FIGS. 6A and 6B are charts showing ideal characteristics for an optical low-pass filter needed in the imaging device of FIG. 4.
Figure 6B:
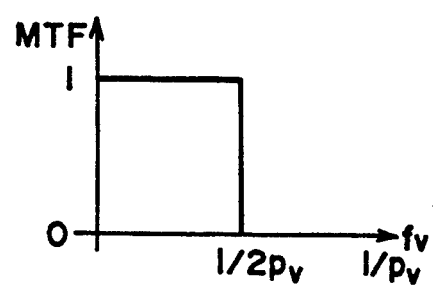
Figure 7:
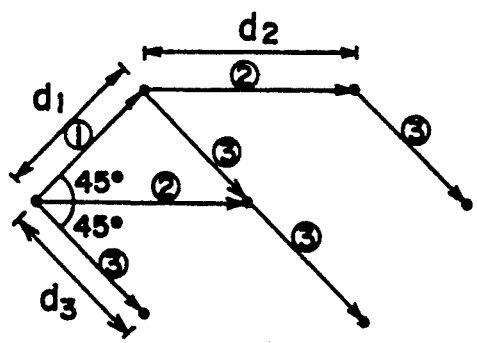
FIG. 7 is a chart showing the way a ray of light is separated by a conventional optical low-pass filter.

Thus, the carrier components can be suppressed to a practically permissible degree. As for the MTF in the vertical direction, it is as shown in FIG. 3B. Thus, the MTF characteristics can be brought close to the ideal curves shown in FIGS. 6A and 6B in terms of both the horizontal and vertical directions.

Next, desirable values of $d_2$ and $d_1$ in this invention will be considered with reference to the above embodiment and equations (1) and (2).

First, a desirable value of the separation distance $d_2$ determined by the second sub-refractive plate 12, which determines the trap point B shown in FIG. 3 and mainly related to the horizontal direction, will be considered. By keeping $d_2$ within the range: $0.4p_H \leq d_2 \leq 0.6p_H$, the illumination signal carrier component in the horizontal direction can be satisfactorily suppressed to a practically permissible degree.

If the value of $d_2$ is smaller than the lower limit of the above inequality, the trap point B is shifted to the high frequency side, with the result that the aliasing distortion of the illumination signal increases. If, conversely, the value of $d_2$ is larger than the higher limit of the above inequality, the trap point B is shifted to the low frequency side, resulting in the horizontal resolution being deteriorated.

Figure 8A:
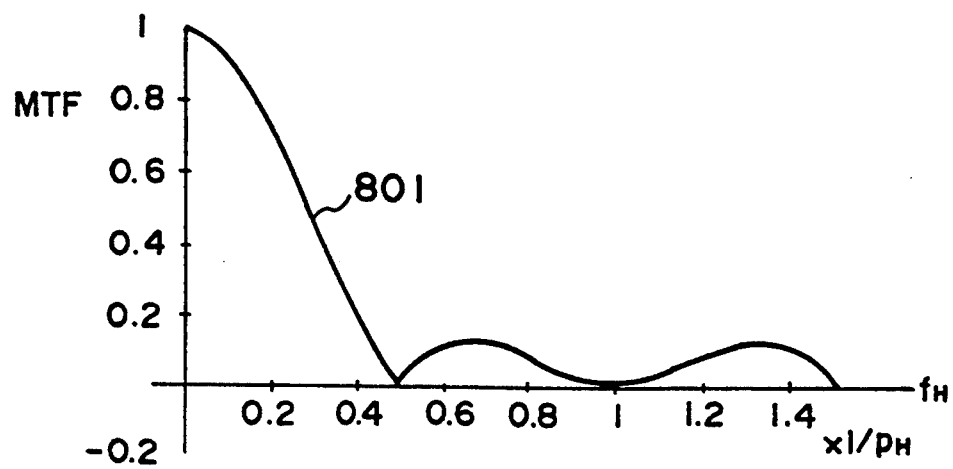
FIGS. 8A and 8B are charts showing the MTF characteristics of a conventional optical low-pass filter.
Figure 8B:
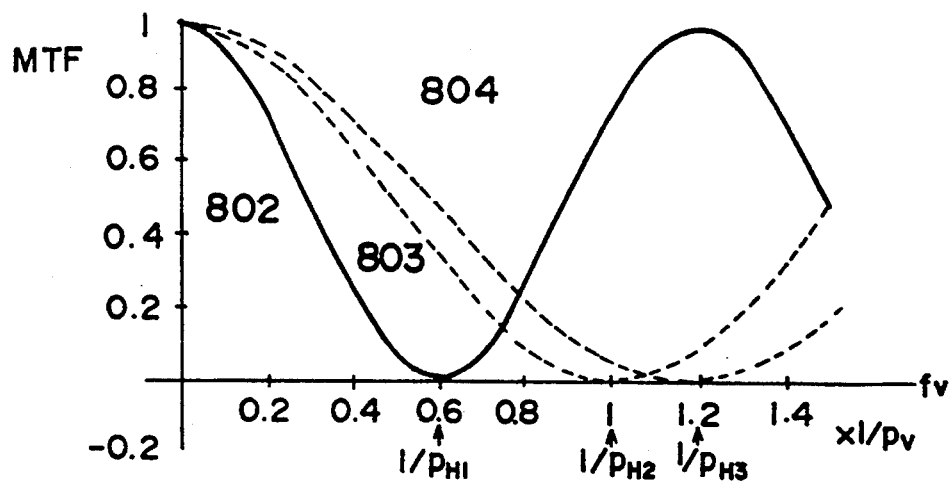
Figure 9:
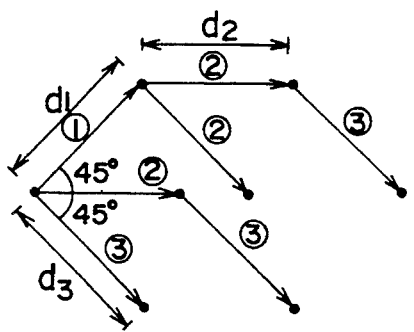
FIG. 9 is a chart showing the way a ray of light is separated by a conventional optical low-pass filter.
Figure 10A:
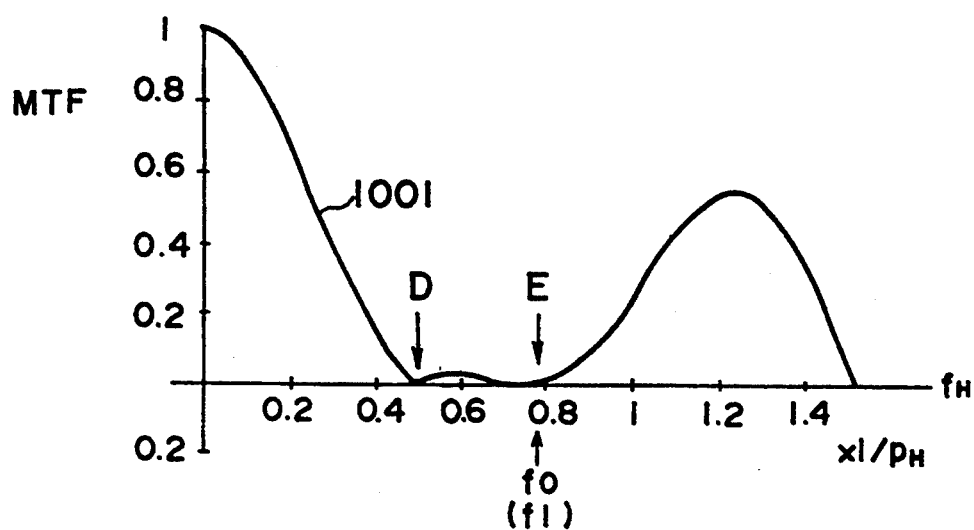
FIGS. 10A and 10B are charts showing the MTF characteristics of a conventional optical low-pass filter.
Figure 10B:
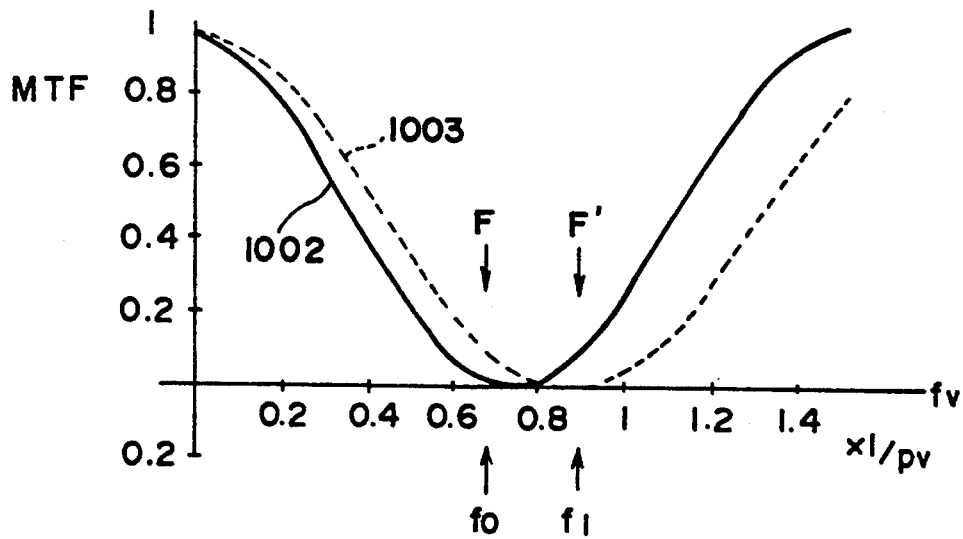

As for the separation distances $d_1$ and $d_3$ ($\simeq d_1$) of the first and third sub-refractive plates 11 and 13, they determine the trap points A and C of FIGS. 3A and 3B with respect to the horizontal and vertical directions. In particular, as stated above, the respective projection components of $d_1$ and $d_3$ ($\simeq d_1$) to the horizontal direction are made longer than $d_2$, that is, they are so determined that the relationship: $d_1 > \sqrt{2}d_2$ is satisfied, thereby causing the trap point A where the primary differential coefficient is zero to be on the low frequency side with respect to the trap point B, which is determined by $d_2$. This implies that, with the characteristic obtained by this invention, a wider range can be secured for the trap point on the low frequency side, i.e., the trap point A, as compared with the case of the prior-art characteristics shown in FIGS. 8A and 10A, where the point at which the primary differential coefficient is not zero is shifted to the low frequency side with respect to the point where the primary differential coefficient is zero.

Accordingly, $d_1$ and $d_3$ ($\simeq d_1$) also determine the point C where the primary differential coefficient is zero with respect to the MTF characteristic in the vertical direction. In this regard, a larger range of the value of $d_{21}$ (i.e., the thickness of the sub-refractive plate) is available for the suppression of the illumination signal carrier component in the vertical direction and the color different signal carrier component in the horizontal direction, which means a more flexible selection can be made in this connection. This is effective in suppressing the illumination signal carrier in the vertical direction and balancing the color difference signal in the horizontal direction when the pitch $p_H$ in the horizontal scanning direction is smaller than the pitch $p_V$ in the vertical direction, and further, in reducing the size and the production cost of the optical low-pass filter. Thus, when the position of the trap point (FIG. 3B) is optimized in order to suppress the carrier in the vertical direction, the MTF characteristic is not affected by the MTF characteristic even if the position of the trap point A is somewhat deviated from the position optimum for suppressing the carrier in the horizontal direction. Further, this arrangement is advantageous in that, if the thicknesses of the sub-refractive plates constituting the optical low-pass filter are diminished with a view to reducing the production cost and the size thereof, the influence of that diminishment is relatively small.

Further, the value of $d_1$ is desirably so determined that the following inequality is satisfied:

$$p_V/\sqrt{2} \leq d_1 \leq \sqrt{2} p_H$$

whereby the illumination signal carrier component in the vertical direction and the color difference signal carrier component in the horizontal direction can be simultaneously suppressed in a satisfactory manner. If the value of $d_1$ is smaller than the lower limit of the above inequality, the aliasing distortion of the vertical illumination signal increases. If, conversely, the value is in excess of the upper limit of the inequality, the MTF characteristic in the horizontal direction excessively deteriorates, resulting in a poor horizontal resolution.

As described above, the present invention makes it possible to obtain an optical low-pass filter which provides a satisfactory characteristic in terms of both the horizontal and vertical directions. In particular, in accordance with the present invention, a substantial improvement can be achieved over the prior art in terms of the characteristic in the vertical direction. Thus, this invention makes it possible to improve the picture quality of a solid state imaging camera, in particular, that of a high resolution camera using a solid state imaging device which has a relatively large number of pixels in the horizontal direction.

What is claimed is:

1. An imaging apparatus comprising:
   a photographic lens;

a single plate type solid state image sensing means arranged at a predetermined image plane position of said photographic lens; and an optical low-pass filter positioned in front of said solid state image sensing means, said optical low-pass filter including: a first sub-refractive plate constructed and arranged to separate an incident ray of light by a separation distance of $d_1$ in a direction deviated 45° clockwise or counterclockwise with respect to the horizontal scanning direction of said solid state image sensing means; a second sub-refractive plate constructed and arranged to separate an incident ray of light by a separation distance of $d_2$ in a direction parallel to said horizontal scanning direction; and a third sub-refractive plate constructed and arranged to separate an incident ray of light by a separation distance of $d_3=d_1$ in a direction perpendicular to the direction of separation of said first sub-refractive plate, wherein said second subrefractive plate is arranged between said first and third sub-refractive plates; and wherein the condition: $d_1 > \sqrt{2}d_2$ is satisfied; wherein further, assuming that a sampling pitch in a horizontal scanning direction of said image sensing device is $p_H$ and that a sampling pitch thereof in a vertical direction is $P_v$, the following conditions also are satisfied:

$p_H < p_v$,
$p_v/\sqrt{2} \leq d_1 \leq \sqrt{2}p_H$, and
$0.4p_H \leq d_2 \leq 0.6p_H$.

2. An imaging apparatus according to claim 1 further comprising a color filter being arranged before said single plate type solid state image sensing means.

* * * * *

UNITED STATES PATENT AND TRADEMARK OFFICE
CERTIFICATE OF CORRECTION

PATENT NO. : 5,452,129

DATED : September 19, 1995

INVENTOR(S) : AKIHIRO SHIRAISHI

It is certified that error appears in the above-indentified patent and that said Letters Patent is hereby corrected as shown below:

ON THE COVER PAGE

Item: [63] Related U.S. Application Data

"Continuation-in-part" should read --Continuation--.

COLUMN 1

Line 5, "No. 07/675,996" should read --No. 07/675,966--.

COLUMN 2

Line 12, "$d_2 \sqrt{2}$ are" should read --$d_2\sqrt{2}$ are--.

COLUMN 3

Line 59, ")" should read --).--.

COLUMN 5

Line 40, "realized.As" should read --realized. As--.

UNITED STATES PATENT AND TRADEMARK OFFICE
CERTIFICATE OF CORRECTION

PATENT NO. : 5,452,129
DATED : September 19, 1995
INVENTOR(S) : AKIHIRO SHIRAISHI It is certified that error appears in the above-indentified patent and that said Letters Patent is hereby corrected as shown below:

COLUMN 7

Line 1, (currently blank) should read --Assuming, by way of example,--.

COLUMN 8

Line 12, "$d_{21}$" should read --$d_1$--.

COLUMN 10

Line 3, "subrefractive" should read --sub-refractive--.
Line 14, "claim 1" should read --claim 1,--.

Signed and Sealed this

Twenty-sixth Day of March, 1996

Attest:

BRUCE LEHMAN

Attesting Officer

Commissioner of Patents and Trademarks